United States Patent
Joseph et al.

(10) Patent No.: US 9,571,867 B2
(45) Date of Patent: *Feb. 14, 2017

(54) METHOD AND SYSTEM FOR AUTHORIZING PLAYBACK FROM MULTIPLE DEVICES

(71) Applicant: The DIRECTV Group, Inc., El Segundo, CA (US)

(72) Inventors: Kuriacose Joseph, Gaithersburg, MD (US); Scott D. Casavant, Germantown, MD (US); Sean S. Lee, Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/294,368

(22) Filed: Jun. 3, 2014

(65) Prior Publication Data

US 2014/0310737 A1    Oct. 16, 2014

Related U.S. Application Data

(63) Continuation of application No. 13/611,640, filed on Sep. 12, 2012, now Pat. No. 8,752,206.

(51) Int. Cl.

| | |
|---|---|
| *H04N 21/254* | (2011.01) |
| *H04N 21/41* | (2011.01) |
| *H04N 21/414* | (2011.01) |
| *H04N 21/472* | (2011.01) |
| *H04N 21/658* | (2011.01) |
| *H04N 21/6587* | (2011.01) |
| *H04N 21/432* | (2011.01) |
| *H04N 21/2347* | (2011.01) |

(Continued)

(52) U.S. Cl.
CPC ...... *H04N 21/2541* (2013.01); *H04N 21/4126* (2013.01); *H04N 21/41407* (2013.01); *H04N 21/4325* (2013.01); *H04N 21/47202* (2013.01); *H04N 21/6581* (2013.01); *H04N 21/6587* (2013.01); *H04N 21/2347* (2013.01); *H04N 21/25841* (2013.01); *H04N 21/25875* (2013.01); *H04N 21/4753* (2013.01)

(58) Field of Classification Search
CPC ............. H04L 9/32; H04L 63/10; G06F 21/10
USPC .......... 725/25, 118, 82; 726/19, 28; 709/221
See application file for complete search history.

(56) References Cited

U.S. PATENT DOCUMENTS

| | | | | |
|---|---|---|---|---|
| 6,211,873 B1 * | 4/2001 | Moyer | ............. | G06F 17/30994 707/E17.142 |
| 7,359,620 B2 * | 4/2008 | Morinaga | ............ | H04N 21/235 348/E5.007 |

(Continued)

*Primary Examiner* — Dede Zecher
*Assistant Examiner* — Viral Lakhia
(74) *Attorney, Agent, or Firm* — Harness, Dickey & Pierce, PLC

(57) ABSTRACT

A system and method for using content on multiple devices includes a head end associating a first user device and a second user device with a user account and authorizing the first user device and the second user device to receive content. The first user device forms a selection signal corresponding to a first content. The head end communicates the first content to the first user device corresponding to the selection signal. The first user device displays the first content on a first display associated therewith. The second user device receives the first content and displays the first content on a second display associated with the second user device.

14 Claims, 7 Drawing Sheets

(51) Int. Cl.
*H04N 21/258* (2011.01)
*H04N 21/475* (2011.01)

(56) References Cited

U.S. PATENT DOCUMENTS

| | | | | |
|---|---|---|---|---|
| 7,924,813 | B1* | 4/2011 | Gerszberg | H04M 1/2478 348/14.08 |
| 8,719,921 | B2* | 5/2014 | Johansson | 726/19 |
| 8,763,029 | B1* | 6/2014 | Haberman | H04N 21/25435 725/32 |
| 8,782,170 | B2* | 7/2014 | Kikkawa | H04N 7/17336 709/219 |
| 2008/0155634 | A1* | 6/2008 | Khedouri et al. | 725/118 |
| 2008/0216145 | A1* | 9/2008 | Barton et al. | 725/131 |
| 2009/0240710 | A1* | 9/2009 | Bilman | G11B 27/034 |
| 2010/0235869 | A1* | 9/2010 | Zhao et al. | 725/82 |
| 2011/0244442 | A1* | 10/2011 | Sheeley | B43K 29/08 434/408 |
| 2012/0054876 | A1* | 3/2012 | Johansson | 726/28 |
| 2012/0084803 | A1* | 4/2012 | Johansson et al. | 725/25 |
| 2013/0173765 | A1* | 7/2013 | Korbecki | 709/221 |
| 2013/0273938 | A1* | 10/2013 | Ng | H04W 64/00 455/456.1 |
| 2015/0121440 | A1* | 4/2015 | Wong | H04N 21/41407 725/109 |

* cited by examiner

METHOD AND SYSTEM FOR AUTHORIZING PLAYBACK FROM MULTIPLE DEVICES

TECHNICAL FIELD

The present disclosure relates to a content communication system, and, more specifically, to enabling multiple user devices associated with an account to access the same content.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the other content distribution networks such as the Internet. Network connections provide additional means for providing content to customers.

Content may also be provided to a set top box on an individual basis for pay. For example, on-demand content may be provided to a set top box after ordering the content from the set top box. Other types of user devices may also have access or may be provided on-demand content. In a typical system, when content is ordered from a set top box, other user devices such as a mobile user device do not have access to the same content. This may be for many reasons including formatting issues. Providing access to the content at other user devices associated with an account would provide the user with greater flexibility and convenience for accessing the content.

SUMMARY

The present disclosure provides a method and system for providing access to content using multiple user devices associated with an account. A further example provides accessibility to content from the position in the content that was previously being viewed.

In one aspect of the disclosure, a system for using content on multiple devices comprises a head end associating a first user device and a second user device with a user account and authorizing the first user device and the second user device to receive content. The first user device forms a selection signal corresponding to a first content. The head end communicates the first content to the first user device corresponding to the selection signal. The first user device displays the first content on a first display associated therewith. The second user device receives the first content and displays the first content on a second display associated with the second user device.

In a further aspect of the disclosure, a method comprises associating a first user device and a second user device with a user account at a head end, authorizing the first user device and the second user device to receive content, selecting a first content title from the first user device to form a selection signal, communicating the first content to the first user device corresponding to the selection signal, displaying the first content on a first display associated with the first user device, communicating the first content to the second user device and displaying the first content on a second display associated with the second user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
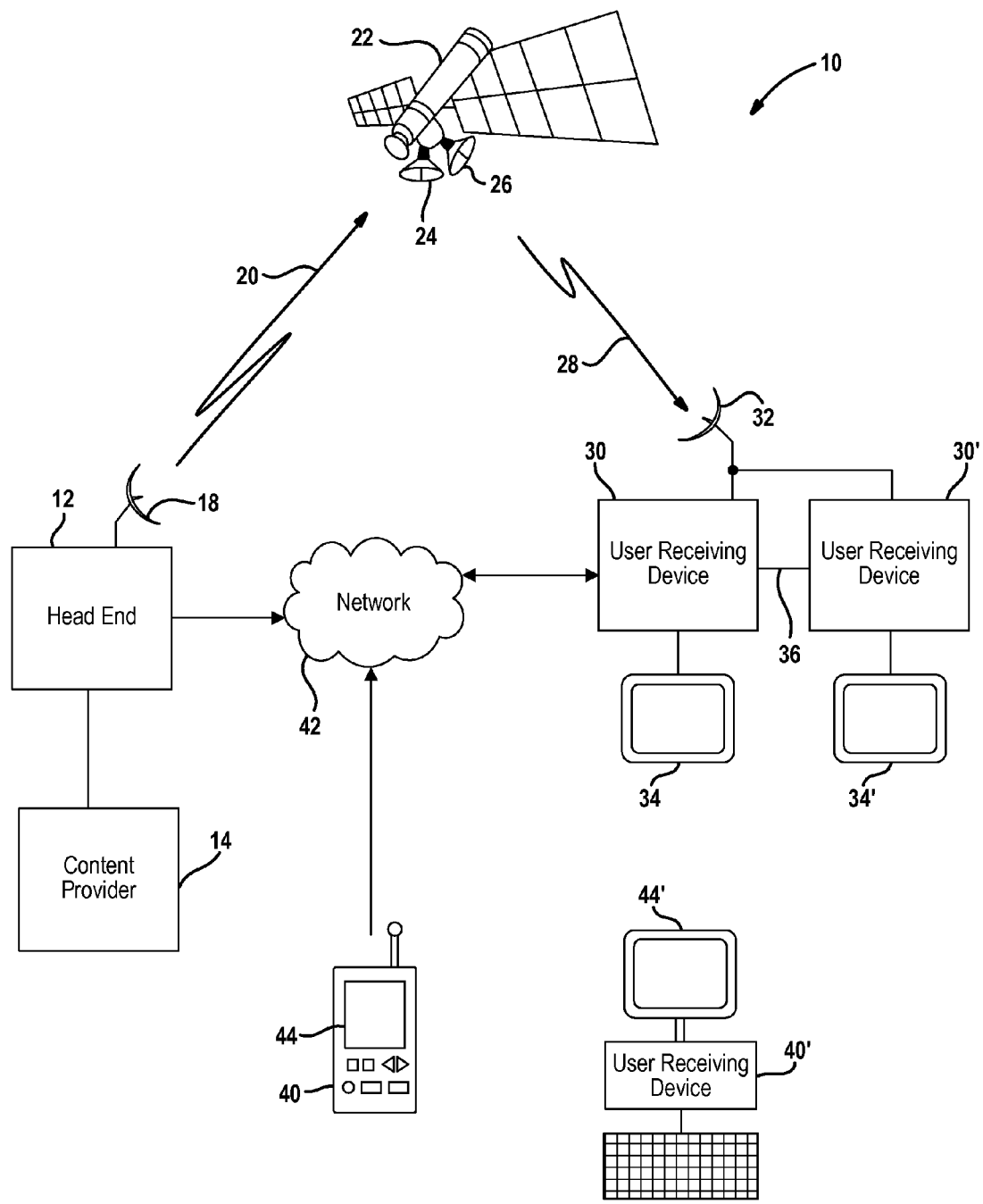
FIG. 1 is a block diagrammatic view of a content communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a communication system 10 is illustrated. The communication system 10 includes a head end 12 that is used as a content processing system and a transmission source. The head end 12 may also be used for distributing content and providing billing data. The details of the head end 12 will be further described below in FIG. 2.

A plurality of content providers 14, only one of which is illustrated, may provide content and data related to the content such as metadata to the head end 12. The head end 12 receives various types of content and data from the content provider and communicates the content to various user devices associated with the system.

The head end 12 may communicate content to users in various manners including a satellite system and through terrestrial networks. Carrying through with the satellite example, the head end 12 includes an antenna 18 for communicating process content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

Two different types of user devices are illustrated. In this example, a first user device 30 includes a receiving antenna 32. The user device 30 has a display 34 associated therewith. The user device 30 may be referred to as a fixed user device because the user device is intended to be used from a fixed position on the surface of the earth. The user device 30 may be referred as a set top box. The user device 30 may include circuitry to tune, decode and store content therein. Details of the user device 30 are further described below.

The user device 30 may be in communication with a second user device 30' through a network 36 such as a local area network. The second user device 30' may be associated with a display 34'. Content may reside in one or the other user device 30, 30' and may be delivered to another in a multi-room viewing function.

Another type of user device includes a network user device 40. The network user device 40 may not be capable of receiving signals from the satellite 22. Rather, the network user device 40 may receive content through a network 42. The network user device 40 may include a display 44 for displaying content thereon. The network user device 40 may include various circuitry including a browser or other processing circuitry for receiving, decoding and processing the content so it may be displayed on the display 44. Details of the network user device will be further described below.

Another example of a network user receiving device 40' is a computer. The computer may also include a display 44' for displaying content thereon. The computer 40' may be a fixed (desktop) computer or a mobile (laptop) computer. The network user device 40 may be a mobile phone, personal digital assistant, or the like.

Several user network device devices and user devices may be associated with a single account.

The network 42 may be a single network or a combination of different networks or different types of networks. For example, the network 42 may be a broadband wired network or wireless network. The network 42 may be a one-way network so that data may be communicated from the user device 30 to the head end 12. The network 42 may also be used in a two-way capacity for delivering content from the head end 12 in response to selection signals communicated from the user device 30, 30', 40 or 40'. The network 42 may be in communication with the local area network 36.

Figure 2:
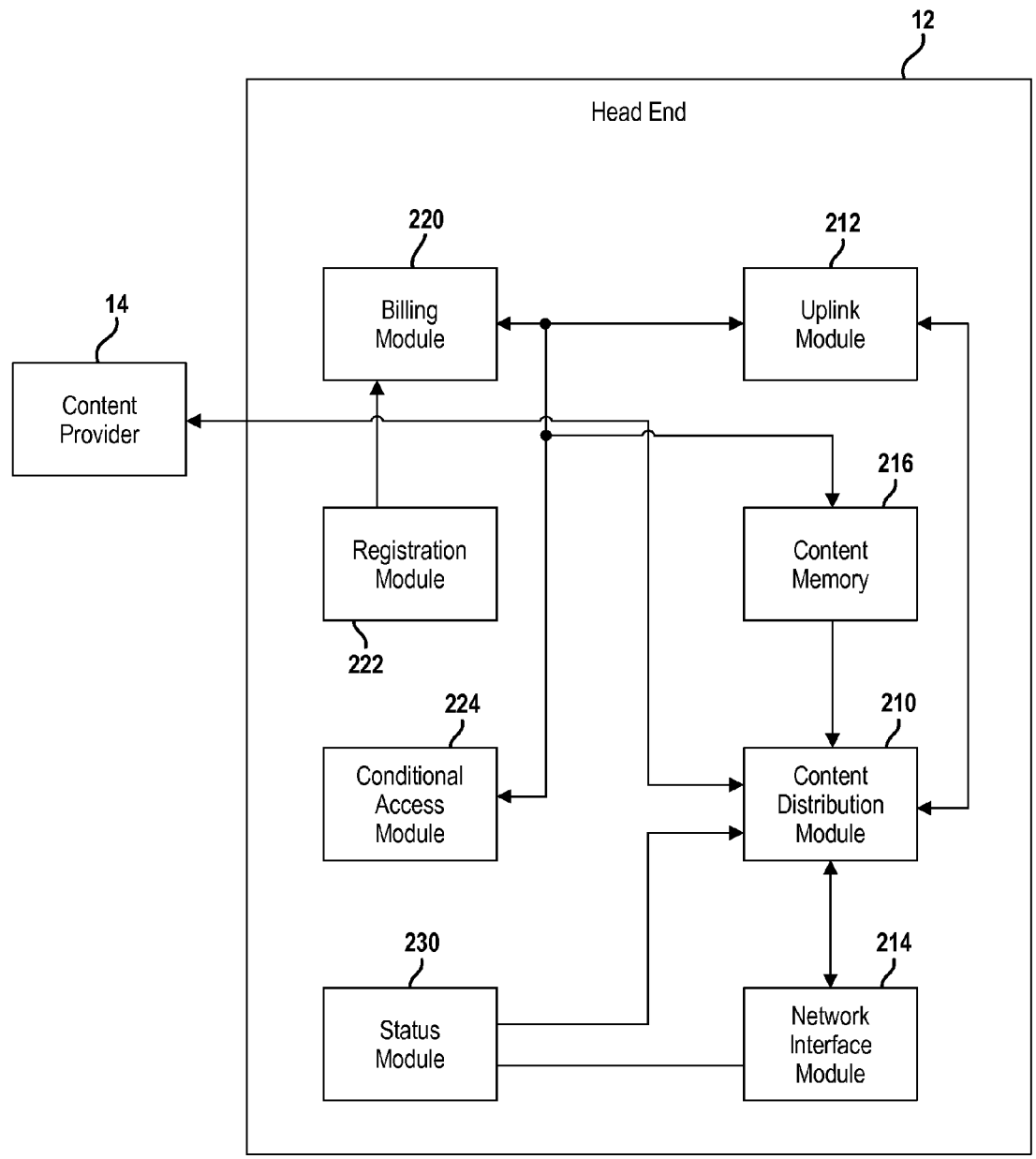
FIG. 2 is a block diagrammatic view of a head end according to the disclosure.

Referring now to FIG. 2, details of the head end 12 relevant to the present example are set forth. It should be noted that the head end 12 is illustrated within one box which may represent one or more facilities. That is, each of the individual components illustrated within the head end 12 may be physically located in various locations.

The head end 12 may include a content distribution module 210 that is used for distributing content through different means. The head end 12 may be in communication with an uplink module 212 for uplinking content to the satellite illustrated in FIG. 1. The content distribution module 210 may thus format the signal in an appropriate format for uplinking through the uplink module 212. The uplink module 212 may uplink various content including a first content and a second content through the satellite to the user devices. The content distribution module 210 may also transcode the content in a format suitable for use by the receiving device.

The uplink module 212 may also communicate conditional access data to the user devices for accessing the content. The conditional access data may be communicated in a conditional access packet that includes data for tuning the user device to receive the data. The conditional access data may be received directly or indirectly from conditional access module 224. The conditional access module 224 may provide conditional access signals to the billing module 220 to allow a particular user access to content. The conditional access module 224 may generate a conditional access packet together with data from the billing module 220 for uplinking through the uplink module 212. If the content is satellite content, access data such as but not limited to the particular transponder, channel and time at which the content is broadcasted may be provided in the conditional access packet. If the content is to be provided over an internet or other broadband-type network, the IP address of the content may be provided. The conditional access packet may also include encryption/decryption information for the user device to receive the content and decode the content.

The content distribution module 210 may also be in communication with a network interface module 214. The network interface module 214 may be in communication with the network 42 for communicating content there through. The network interface module 214 (or the content distribution module 210) may format the content signals into internet protocol signals for distribution through the network 42.

The content distribution module 210 may also be in communication with content memory 216. The content memory 216 may be referred to as a content repository. The content memory 216 may receive content from the content provider 14 for distribution through the satellite system or the network 42. The content memory 216 may save on-demand or pay-per-view content therein.

The content provider 14 may also provide live television content for distribution through the content distribution module 210. The content distribution module 210 may thus communicate live content through the uplink module 212 or through the network interface module 214 to the appropriate networks.

A billing module 220 may also be incorporated into the head end 12. The billing module 220 may be used for associating one or more user devices with a user account. For example, different types of user devices such as a plurality of mobile devices and one or more fixed set top boxes may be associated with a user account. By associating the plurality of user devices with a user account, content may be shared or accessed by each of the user devices associated with an account.

A registration module 222 may be used to associate each of the plurality of user devices with a user account at the billing module 220. The registration module 222 may be an automated system through which the user calls or accesses remotely by computer for associating the plurality of user devices with the account. The registration module 222 may also be partially human activated in which a customer service representative enters the data for multiple user devices and associates the user devices with an account.

A status module 230 may also be included within the head end 12. The status module 230 may receive a position status signal from one of the user devices through the network 42. The status module 230 may, for example, store the position status of the content. Many position status signals may be maintained per user and per piece of content. That is, the content position of one or more different positions for different content titles may be stored. The position status signal corresponds to a content position last used or last viewed within the content. The time or time code of the exact frame the user left off at may be used. A second position status signal may be generated at the status module 230 to be sent to a second user device when that second user device requests access to content previously accessed by a first user device. For example, if a user stops or pauses content, a time code or other time indicator may be saved for that particular content for the user. When another user device selects the content, the second user device receives a second position signal. The user may then be prompted to restart the content from the position the previous viewing left off. This will be described further below.

Figure 3A:
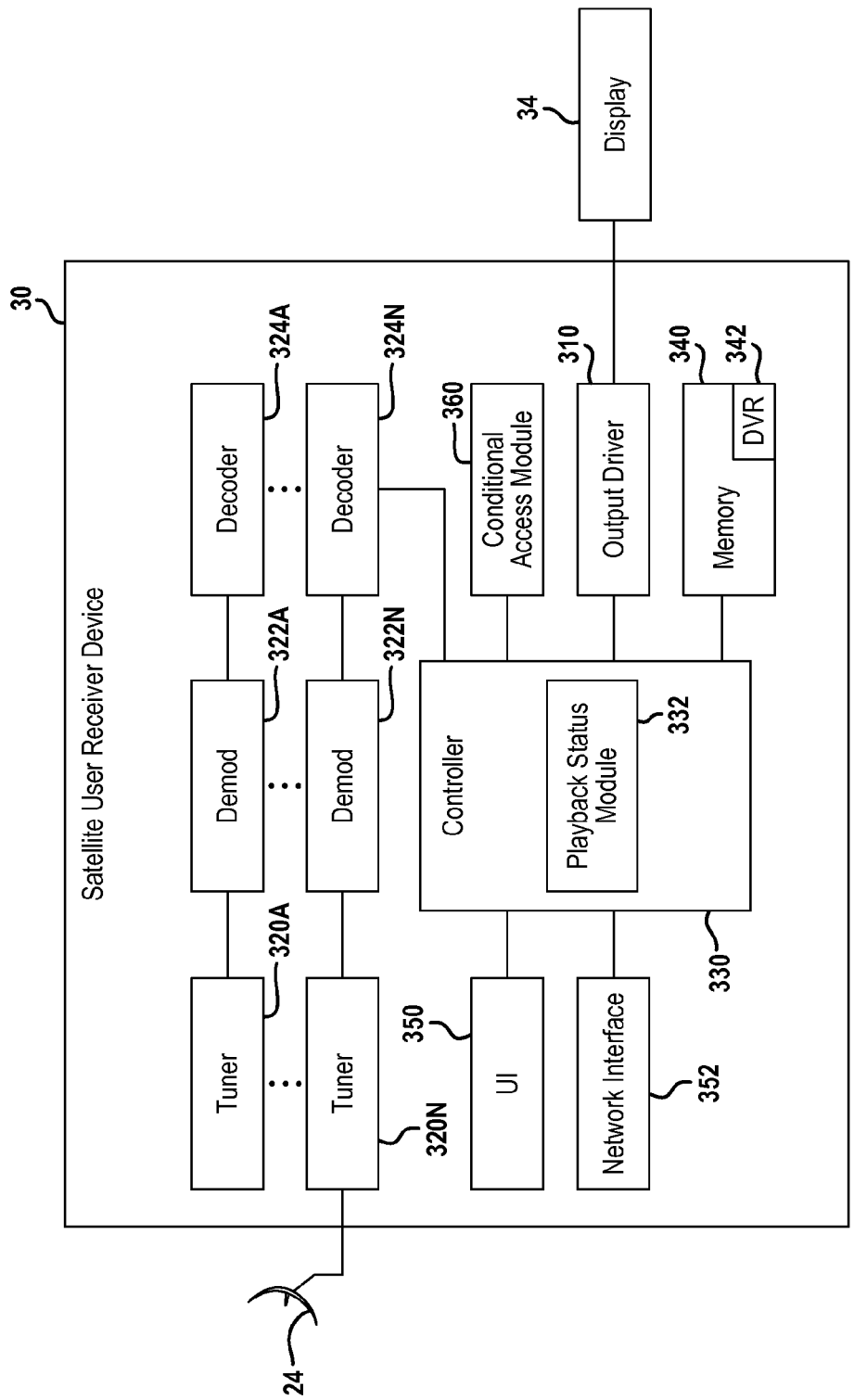
FIG. 3A is a block diagrammatic view of a satellite user device.

Referring now to FIG. 3A, the user receiving device 30 or set top box is illustrated in further detail. Although, a particular example using the set top box is illustrated, it is merely representative of various electronic devices with an internal controller used as a content receiving device. The antenna 24 may be one of a number of different types of antennas that may include one or more low noise blocks associated therewith. The antenna 24 may be a single antenna used for satellite television reception. Of course, multiple antennas for receiving signals from satellites in different orbital slots may be used. In a terrestrial system such as a cable television system, no antenna may be used. Rather, a connector to a fiber optic or coaxial cable may be used. The user receiving device 30, as described above, is coupled to a display 34. The user receiving device 30 may have an output driver 310 for formatting video and audible signals for the display 34.

A controller 330 may be a general processor such as a microprocessor that cooperates with control software. The controller 330 may be used to coordinate and control the various functions of the user receiving device 30. These functions may include tuner 320A-320N (collectively 320), demodulator 322A-322N (collectively 322), decoders 324A-324N (collectively 324) such as forward error correction decoders and any buffer or other functions.

The controller 330 may include a playback status module 332 included therein. The playback status module 332 may provide a playback status signal corresponding to the last played or last viewed position within the content. As mentioned above, the last played position of the content may correspond to a frame number in a time code of the content or an elapsed time since the beginning of the content. Other representations of time or time indications may also be provided to correspond to the last played position of the content. The playback status module 332 may periodically provide a playback status to the head end so that other devices may resume playback at the last point viewed by the user of the user device 30.

The tuners 320 receive the signal or data from the individual channel. The tuners 320 may receive data from a satellite or a source such as cable or over-the-air TV broadcasts. The tuners 320 may receive television programming content, program guide data or other types of data. The demodulators 322 demodulate the signal or data to form a demodulated signal or data. The decoders 324 decode the demodulated signal to form decoded data or a decoded signal. The controller 330 may be similar to that found in current DIRECTV® set top boxes which uses a chip-based multifunctional controller. By providing a number of tuners, demodulators and decoders, a number of different content programs may be used by the receiving device. For example, live viewing and recording may be performed simultaneously. A number of recordings may be made simultaneously depending on the number of tuners available.

The controller 330 is in communication with a memory 340. The memory 340 is illustrated as a single box. The memory 340 may be implemented as a plurality of different types of memory including the hard drive, a flash drive and various other types of memory. The memory 340 may be other types of memory or sections of different types of memory. The memory 340 may be non-volatile memory or volatile memory. The memory 340 may include a DVR 342. The DVR 342 may include recorded content stored for later playback.

The memory 340 may include storage for various operational data collected during operation of the receiving device 30. For example, the memory 340 may store a profile or the data used to build the profile. Another type of data in the memory 340 may include the channels subscription data, the blocked channels, adult channels, rating limits set by the user receiving device 30, current set top box language, TV resolution data, to do list data, the conditional access module identifier, time zone data, time of day daylight savings, status data, aspect ratio data, viewing hours data, quick tune list and a zip code.

The memory 340 may also store the advanced program guide data. The memory 340 may store program guide data that is received at the head end. The program guide data may include amounts of data including two or more weeks of program guide data. The program guide data may be communicated to the user receiving device 30 in various manners including through the satellite 22 of FIG. 1. The program guide data may include content or program identifiers, and various data objects corresponding thereto.

The user receiving device 30 may also include a user interface 350. The user interface 350 may be various types of user interfaces such as a keyboard, push buttons, a touch screen, a voice activated interface or the like. The user interface 350 may be used to select a channel, select various information such as content selections, change the volume, change the display appearance, or other functions. The user interface 350 may also be used for selecting playback locations of the content.

A network interface 352 may be included within the user device 30 to communicate various data through the networks 36/42 described above. The network interface 352 may be a WiFi, WiMax, WiMax mobile, wireless, cellular, or other types of communication systems. The network interface 352 may use various protocols for communication therethrough including, but not limited to, hypertext transfer protocol (HTTP).

The user device 30 may also include a conditional access module 360. The conditional access module 360 prevents unauthorized reception of the television signals through the antenna 24. The conditional access module 360 may use a cryptographic hash to authorize the use and display of the received signals. The conditional access module 360 may receive the proper codes or signals from the head end.

Figure 3B:
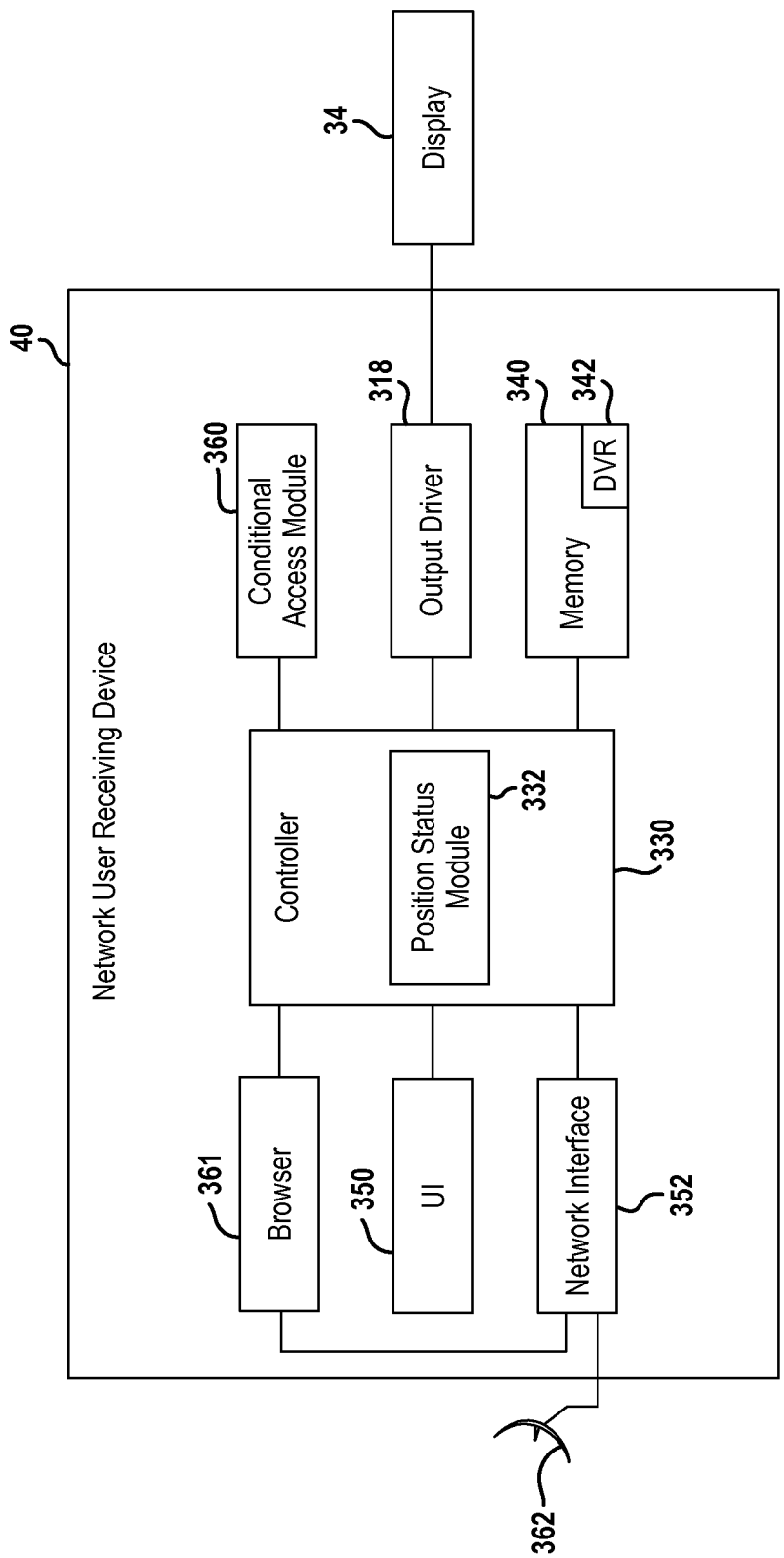
FIG. 3B is a block diagrammatic view of a network user device.

Referring now to FIG. 3B, a user device 40 is set forth. In this example, the same components from FIG. 3A are not described again. In this example, a browser 361 may be used to receive content and communicate data to the controller 330. The data may include a position status signal. The browser 361 may also communicate playback status signals to the head end through the network. The browser 361 may be in communication with the network interface module 352. The network interface module may communicate wireless signals through the antenna 362.

Figure 4A:
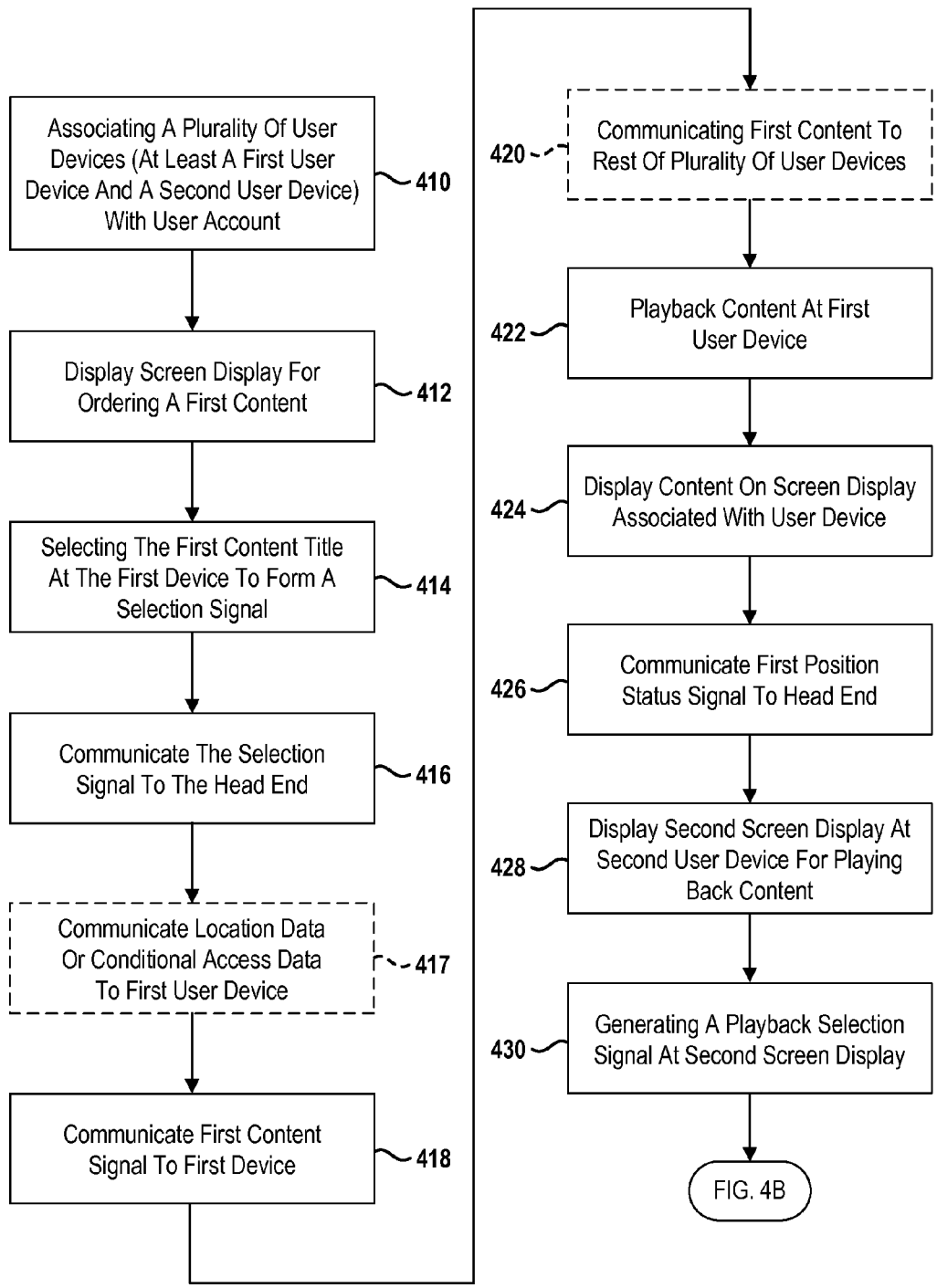
FIGS. 4A and 4B are a continuous flowchart of a method for operating the system.
Figure 4B:
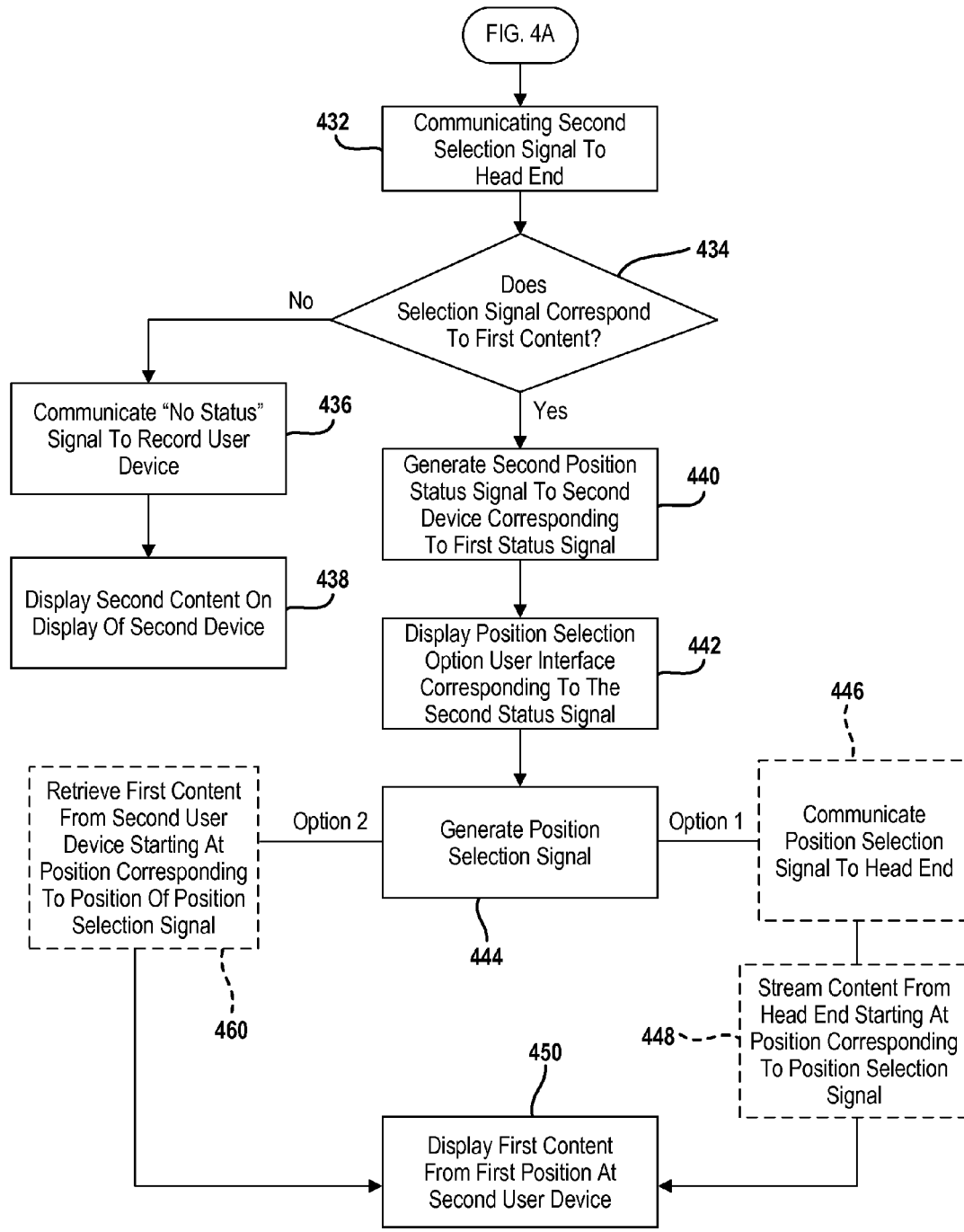

Referring now to FIG. 4, a method of playing back content is set forth. In step 410, a plurality of user devices are associated with an account at the head end. The head end may also determine a location of a user (such as a hotel) and associate a user device (hotel room set top or set back box) with the user account at least temporarily. The location determination may be a signal from a user that determines where the user will be and communicates the location and possible time at the location to the head end. This step may be performed on an ongoing basis for devices "temporarily" associated with a user. As mentioned above, a billing module 220 and a registration module 222 illustrated in FIG. 2 may be used to associate the user devices with an account. A user device identifier, a conditional access module code, a serial number or other identifier may be associated with a user account for each user device in a memory of the head end. In this example, at least a first and a second user device are registered or associated with the user account. When two user devices are registered, the same content is authorized to be received by both user devices.

In step 412, a screen display for ordering a first content is set forth. A screen display may include one or a variety of contents for selecting playback. The content may be streamed or is stored within the user device. In step 414, a first content title is selected at the first user device to form a selection signal. The content may be paid for in advance. In step 416, the selection signal corresponding to the first content title is communicated to the head end. Steps 414 and 416 may not use the actual title but rather an indicator uniquely identifying the content such as a material identifier. Because of the authorization, all devices may be enabled to receive the content. A third user device may be used to communicate the selection signal. For example, a user may have a first set top box in a first room and a second set top box in a second room. A third device, such as a tablet computer, may originate the signal and that results in the control and position information being sent to both the first and second set top boxes.

An optional step 417, in which a URL or other location identifier is received from the head end when the head end is not communicating the content, is performed. For example, location metadata or a unique identifier may allow the first user-receiving device to receive the content from another server or device. Conditional access data such as availability data may also be provided.

In step 418, a first content signal is formed for communicating the first content to the first user receiving device. An optional step 420 may communicate the first content to the other plurality of user devices associated with the account capable of receiving the content. As will be described below, the content may not be presented on the display of other user devices associated with the account until specifically selected or requested by the particular device. The optional step 420 may communicate metadata location information to the other plurality of user devices associated with the account such that the plurality of devices can retrieve the content from the metadata location information. An example of the metadata would be satellite tuning parameters or a web URL.

In step 422, the content may be played back or otherwise utilized at the first user device. Playback may include playing back at normal speed, playing back at an advanced speed, rewinding or other types of trick play. In step 424, the content is displayed on a screen display associated with the user device. In step 426, the viewing status of the first content is communicated to the head end as a position status signal. That is, a first position status signal may be communicated to the head end corresponding to the currently-watched or last-watched position within the content. Communicating the position status may take place periodically or continually during the playback of the content. The last known position corresponds to the last position status signal sent by the user device. As will be described below, this allows the content to be resumed at another device associated with the user account at the precise or nearly-precise position.

In step 428, a second screen display is displayed at a second user device for playing back content. A playback selection signal is generated in step 430 for playing back the content at the second screen display. This may be an optional step since merely activating a second device may allow the device to automatically resume playback. Multiple devices may be activated in this manner. In other words, no express selection may be required to resume the content. Of course, restrictions may be placed on the number of devices viewing a content by the content provider. The presence of a user may be detected by entering a password or code identifier upon the automation or startup of the device or an application therein for initiating playback. The ability to activate more than one device may be dependent on location. For example, more than one device may be activated in the home LAN but not outside the home LAN.

In step 432, a content selection signal or other indicator signals mentioned above may be communicated to the head end. In step 434, if the selection signal does not correspond to the first content, step 436 communicates a "no status" signal to the second user device. That is, if different content is requested by the second user device, no previous recording status would be recorded or stored within the head end. In step 438, a second content is displayed on the second user receiving device of the content. Note that step 432 is analogous to step 416 of which a second content in step 438 or 450 really is a first content at step 424.

Referring back to step 434, when the selection signal corresponds to the first content, step 440 is performed. In step 440, a second position status signal is communicated to the requesting or second device from the head end corresponding to the first position status signal. The second position status signal communicates the position of content from the first position status signal. In step 442, a position selection option user interface may be displayed to the user to determine if the position of the content is to be resumed at the position corresponding to the last device left off.

Figure 5:
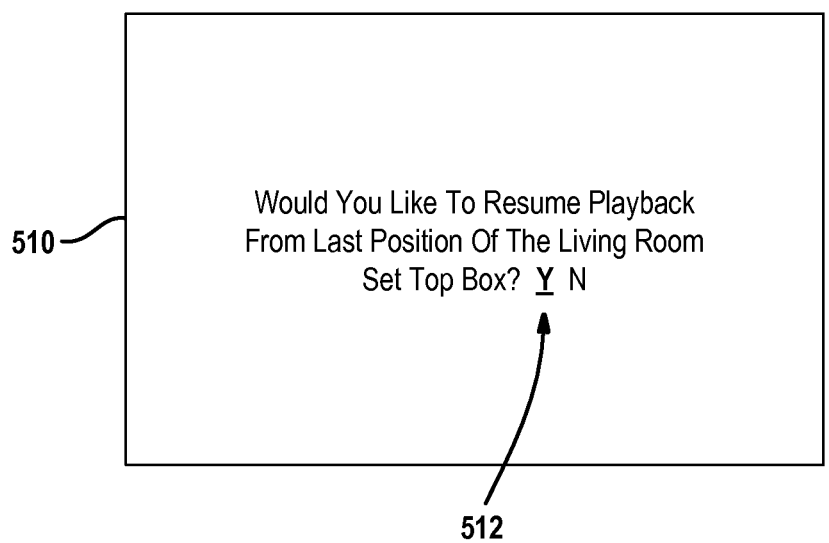
FIG. 5 is an example of a screen display for resuming a position of last playback.

An example of a user interface is set forth in FIG. 5. FIG. 5 illustrates a position selection screen display 510 that provides a user interface 512 for selecting whether or not playback is desired. In this example, the user may select "yes" or "no" and communicate a selection signal to the controller of the user device.

Referring back to step 442, after an affirmative response is received from displaying the first content from the last resumed position a first option is performed. Step 444 generates a position selection signal. In step 446, the position selection signal is communicated to the head end. In step 448, content is streamed starting from the position corresponding to the position selection signal. It should be noted that the first content may be transcoded at the sending device in a format suitable for the receiving device. In step 450, the first content is displayed from the first position at the second user device.

After step 444, a second option may take place. After step 444, step 460 may be performed. Step 460 retrieves the first content from the memory of the second user device starting at the position corresponding to the position of the selection signal. The first content may also be retrieved from another user device in a multi-room viewing configuration. After step 460, step 450 displays the content at the second user device from the first position.

The different options (460, 450 or 446, 448) may be performed if different types of systems are used. Steps 446 and 448 are used when the content is not communicated to the rest of the devices using step 420 described above. Step 460 is performed when the content is communicated to the rest of the user devices associated with the user account in step 420.

The above method also applies equally to multiple devices being used for viewing. For example, a first device is first used for viewing, then a second device, then back to the first device or a third device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising: associating a first user device and a second user device with a user account at a head end;
   authorizing the first user device and the second user device to receive content; selecting a first content title for a first content from the first user device to form a selection signal;
   communicating the first content to the first user device corresponding to the selection signal;
   storing the first content in a memory of the first user device;
   displaying the first content on a first display associated with the first user device by playing back the first content from the memory;
   while displaying the first content on the display associated with the first user device,
   continually communicating a playback position status signal corresponding to a last viewed playback position of the first content and a first user device identifier from the first user device to the head end;
   generating a position selection screen display at the second user device comprising the first user device identifier for selecting the last viewed playback position of the first user device;
   communicating a playback position selection signal to a storage device storing the first content therein, said storage device separate from the first user device;
   displaying the first content at the second user device beginning at the last viewed position in response to the playback position selection signal.

2. The method as recited in claim 1 wherein prior to displaying, communicating the first content from the storage device to the second user device.

3. The method as recited in claim 1 wherein prior to displaying, communicating the first content from the storage device to the second user device in a multi-room viewing configuration.

4. The method as recited in claim 1 wherein prior to displaying, communicating the first content from the storage device to the second user device in a multi-room viewing configuration through a local area network.

5. The method as recited in claim 1 wherein further comprising communicating the first content to the storage device located within the second user device.

6. The method as recited in claim 5 wherein further comprising, prior to displaying, retrieving the first content from the first storage device of the second user device.

7. The method as recited in claim 1 further comprising associating the first user device with a user account in response to a location determination.

8. The method as recited in claim 1 wherein communicating first content to the second user device comprises communicating location metadata of the first content to the second user device, and obtaining the first content at the second user device using the location metadata.

9. The method as recited in claim 1 wherein communicating first content to the second user device comprises communicating a unique identifier of the first content to the second user device and searching for the first content at a content source using the second user device based upon the unique identifier.

10. A system comprising:
- a head end associating a first user device and a second user device with a user account and authorizing the first user device and the second user device to receive content;
- said first user device forming a selection signal corresponding to a first content;
- said head end communicating the first content to the first user device corresponding to the selection signal;
- said first user device storing the first content in a memory of the first user device, playing back the content from the memory, displaying the first content on a first display associated therewith and continually communicating a playback position status signal corresponding to a last viewed playback position of the first content and a first user device identifier from the first user device to the head end while displaying the first content in the first display;
- a storage device separate from the first user device storing the first content therein;
- and said second user device generating a position selection screen display at the second user device comprising the first user device identifier for selecting the last viewed playback position of the first user device and communicating a playback position selection signal to the storage device receiving the first content from the storage device beginning at the last viewed position in response to the playback position selection signal and displaying the content on a display associated with the second user device.

11. The system as recited in claim 10 wherein the storage device communicates the first content to the second user device in response to the selection signal.

12. The system as recited in claim 11 wherein the storage device communicates the first content to the second user device in a multi-room viewing configuration in response to the selection signal.

13. The system as recited in claim 10 wherein the storage device communicates the first content to the second user device in a multi-room viewing configuration through a local area network in response to the selection signal.

14. The system as recited in claim 10 wherein the second user device comprises the storage device.

* * * * *